(12) United States Patent
Alamoudi et al.

(10) Patent No.: US 11,884,567 B2
(45) Date of Patent: Jan. 30, 2024

(54) DESALINATION BRINE CONCENTRATION SYSTEM AND METHOD

(71) Applicant: Saline Water Conversion Corporation, Riyadh (SA)

(72) Inventors: Ahmed Alamoudi, Al-Jubail (SA); Mohammed Ayumantakath, Al-Jubail (SA); Nikolay Voutchkov, Winter Springs, FL (US); Seungwon Ihm, Al-Khobar (SA); Eslam Alwaznani, Al-Jubail (SA)

(73) Assignee: SALINE WATER CONVERSION CORPORATION, Riyadh (SA)

( * ) Notice: Subject to any disclaimer, the term of this patent is extended or adjusted under 35 U.S.C. 154(b) by 77 days.

(21) Appl. No.: 17/161,054

(22) Filed: Jan. 28, 2021

(65) Prior Publication Data

US 2021/0147273 A1     May 20, 2021

Related U.S. Application Data

(62) Division of application No. 16/371,816, filed on Apr. 1, 2019, now Pat. No. 10,947,143.

(51) Int. Cl.
*C02F 9/00* (2023.01)
*B01D 61/02* (2006.01)
(Continued)

(52) U.S. Cl.
CPC .............. *C02F 9/00* (2013.01); *B01D 61/002* (2013.01); *B01D 61/025* (2013.01);
(Continued)

(58) Field of Classification Search
CPC .. C02F 9/00; C02F 1/441; C02F 1/442; C02F 1/445; C02F 2103/08; C02F 2209/03;
(Continued)

(56) References Cited

U.S. PATENT DOCUMENTS

| 2,163,877 A | 6/1939 | Hooker |
| 2,405,055 A | 7/1946 | Robinson et al. |

(Continued)

FOREIGN PATENT DOCUMENTS

| CN | 110064305 | 7/2019 |
| CN | 111484178 | 8/2020 |

(Continued)

OTHER PUBLICATIONS

International Preliminary Report on Patentability (PCT/IB/326 & PCT/IB/373) issued in PCT Application No. PCT/US2019/026804 dated Oct. 14, 2021, including document C3 (Written Opinion (PCT/ISA/237) issued in PCT Application No. PCT/US2019/026804 dated Jul. 3, 2019) (11 pages).

(Continued)

*Primary Examiner* — Pranav N Patel
(74) *Attorney, Agent, or Firm* — NORTON ROSE FULBRIGHT US LLP (57) ABSTRACT

A system and method for producing very high concentration brine streams from which commercially efficiently obtained minerals may be obtained is produced by a dual membrane brine concentrator system (DTRI Concentrator). The system includes a nano-filtration system which removes divalent ions from the seawater, a brine concentrator such as a hollow fine fiber forward osmosis system which receives and further concentrates the brine rejected from the nano-filtration system, a SWRO system which receives the NF system permeate and removes monovalent ions, and another brine concentrator which further concentrates the brine rejected from SWRO system. Various permeate and reject brine flow may be forwarded through the Dual Membrane Brine Concentrator system, and multiple stages of the system components may be used, to enhance brine concentration and improve system efficiency.

16 Claims, 3 Drawing Sheets

(51) Int. Cl.
    *B01D 61/58*     (2006.01)
    *B01D 63/02*     (2006.01)
    *C02F 1/44*     (2023.01)
    *B01D 61/00*     (2006.01)
    *C02F 103/08*     (2006.01)

(52) U.S. Cl.
CPC ......... *B01D 61/026* (2022.08); *B01D 61/027* (2013.01); *B01D 61/58* (2013.01); *B01D 63/02* (2013.01); *B01D 2311/06* (2013.01); *B01D 2311/08* (2013.01); *B01D 2311/14* (2013.01); *B01D 2317/022* (2013.01); *B01D 2317/025* (2013.01); *C02F 1/441* (2013.01); *C02F 1/442* (2013.01); *C02F 1/445* (2013.01); *C02F 2103/08* (2013.01); *C02F 2209/03* (2013.01)

(58) Field of Classification Search
CPC . C02F 2103/00; B01D 61/002; B01D 61/025; B01D 61/026; B01D 61/027; B01D 61/58; B01D 63/02; B01D 2311/06; B01D 2311/08; B01D 2311/14; B01D 2317/022; B01D 2317/025; Y02A 20/131
See application file for complete search history.

(56) References Cited

U.S. PATENT DOCUMENTS

| | | | |
|---|---|---|---|
| 2,536,457 | A | 1/1951 | Martin |
| 4,180,547 | A | 12/1979 | Chirico |
| 4,392,959 | A | 7/1983 | Coillet |
| 5,238,574 | A | 8/1993 | Kawashima et al. |
| 6,113,797 | A | 9/2000 | Al-Samadi |
| 6,508,936 | B1 | 1/2003 | Hassan |
| 7,037,481 | B2 | 5/2006 | Becenel, Jr. |
| 7,083,730 | B2 | 8/2006 | Davis |
| 7,314,606 | B2 | 1/2008 | Sridhar et al. |
| 7,563,375 | B2 | 7/2009 | Liberman |
| 8,128,821 | B2 | 3/2012 | Oklejas, Jr. |
| 8,501,034 | B2 | 8/2013 | Hook et al. |
| 9,005,404 | B2 | 4/2015 | Batty et al. |
| 9,045,351 | B2 | 6/2015 | Wallace |
| 9,206,060 | B1 | 12/2015 | Abusharkh |
| 9,233,340 | B1* | 1/2016 | Elish ..................... B01D 61/12 |
| 9,427,705 | B1 | 8/2016 | Abusharkh |
| 9,808,764 | B2 | 11/2017 | Oklejas, Jr. |
| 10,005,688 | B2 | 6/2018 | Sekine et al. |
| 10,052,589 | B2 | 8/2018 | Oklejas, Jr. |
| 10,071,929 | B2 | 9/2018 | Sekine et al. |
| 10,202,291 | B2 | 2/2019 | Tokunaga et al. |
| 10,214,437 | B2 | 2/2019 | Blohm et al. |
| 10,214,438 | B2 | 2/2019 | Blohm et al. |
| 10,245,555 | B2 | 4/2019 | St. John et al. |
| 10,300,436 | B2 | 5/2019 | Townsend et al. |
| 10,603,635 | B2 | 3/2020 | Wei et al. |
| 10,843,951 | B2 | 11/2020 | Fitzpatrick et al. |
| 10,845,067 | B2 | 11/2020 | Martin |
| 10,947,143 | B2 | 3/2021 | Alamoudi et al. |
| 11,230,479 | B2 | 1/2022 | Mack et al. |
| 11,247,174 | B2 | 2/2022 | Liu et al. |
| 11,279,643 | B2 | 3/2022 | Lahav et al. |
| 2002/0166823 | A1 | 11/2002 | Mukhopadhyay |
| 2004/0211726 | A1 | 10/2004 | Baig et al. |
| 2005/0067341 | A1 | 3/2005 | Green et al. |
| 2006/0157409 | A1 | 7/2006 | Hassan |
| 2007/0080113 | A1 | 4/2007 | Vuong |
| 2007/0246406 | A1 | 10/2007 | Dibel et al. |
| 2010/0192575 | A1 | 8/2010 | Al-Mayahi et al. |
| 2013/0270186 | A1* | 10/2013 | Wohlert ............... B01D 61/025 210/639 |
| 2014/0021135 | A1 | 1/2014 | Sawyer et al. |
| 2014/0216934 | A1 | 8/2014 | Fu et al. |
| 2014/0299546 | A1 | 10/2014 | Eckert et al. |
| 2015/0053085 | A1 | 2/2015 | Mahley, III |
| 2015/0136699 | A1 | 5/2015 | Wohlert |
| 2016/0176728 | A1 | 6/2016 | Lo et al. |
| 2016/0339390 | A1* | 11/2016 | Abusharkh ........... C02F 1/5281 |
| 2017/0144106 | A1 | 5/2017 | McCool et al. |
| 2017/0349465 | A1 | 12/2017 | Blohm et al. |
| 2017/0349467 | A1 | 12/2017 | Blohm et al. |
| 2018/0015415 | A1* | 1/2018 | Nicoll ..................... B01D 61/58 |
| 2018/0236406 | A1 | 8/2018 | St. John et al. |
| 2019/0054421 | A1* | 2/2019 | Wei ........................ C02F 1/445 |
| 2020/0023317 | A1 | 1/2020 | Zhai et al. |
| 2020/0316526 | A1 | 8/2020 | George et al. |
| 2021/0261445 | A1 | 8/2021 | Nakamura et al. |
| 2021/0322929 | A1 | 10/2021 | Mack et al. |
| 2022/0119281 | A1 | 4/2022 | Mack et al. |
| 2022/0249983 | A1 | 8/2022 | Holtzapple |
| 2022/0258102 | A1 | 8/2022 | Townsend et al. |

FOREIGN PATENT DOCUMENTS

| | | | |
|---|---|---|---|
| GB | 2395946 | | 6/2004 |
| JP | 10225683 | | 8/1998 |
| WO | WO 2006/087302 | | 8/2006 |
| WO | WO 2010/077895 | | 7/2010 |
| WO | WO 2010/132104 | | 11/2010 |
| WO | WO 2013/131183 | | 9/2013 |
| WO | WO2017030937 | * | 2/2017 |
| WO | WO 2017/136048 A1 | | 8/2017 |
| WO | WO 2020/041160 | | 2/2020 |
| WO | WO 2021/026498 | | 2/2021 |
| WO | WO 2021/221462 | | 11/2021 |
| WO | WO 2022/061197 | | 3/2022 |
| WO | WO 2022/126671 | | 6/2022 |
| WO | WO 2022/153980 | | 7/2022 |

OTHER PUBLICATIONS

Hindi-language Office Action issued in Indian Application No. 202117046013 dated Apr. 1, 2022 with English translation (six (6) pages).
Davenport et al., "High-Pressure Reverse Osmosis for Energy-Efficient Hypersaline Brine Desalination: Current Status, Design Considerations, and Research Needs", Environmental Science & Technology Letters, Jun. 29, 2018, pp. 467-475, vol. 5 (nine pages).
International Search report (PCT/ISA/220 & PCT/ISA/210) issued in PCT Application No. PCT/US19/26804 dated Jul. 3, 2019 (three pages).
Written Opinion (PCT/ISA/237) issued in PCT Application No. PCT/US19/26804 dated Jul. 3, 2019 (nine pages).
"Chemical Treatment For RO and NF", Hydranautics: Nitto Group Company, Technical Application Bulletin No. 111, pp. 1-16, May 2017.
Altaee et al., "Alternative design to dual stage NF seawater desalination using high rejection brackish water membranes", *Desalination*, 273(2-3), pp. 391-397, 2011.
Bartholomew, T.V. et al., "Osmotically Assisted Reverse Osmosis for High Salinity Brine Treatment", *Desalination*, 421, pp. 3-11, 2017.
Birnhack et al., "Implementation, Design and Cost Assessment of a Membrane-Based Process for Selectively Enriching Desalinated Water with Divalent Seawater Ions", *ChemEngineering*, (2018), 2, 41, pp. 1-13.
Extended European Search Report issued in European Application No. 19923420.4, dated Apr. 24, 2023.
Gräber et al., "A pre-treatment concept for increasing the recovery ratio of coastline BWRO plants, while providing Mg2+ in the product water", *Desalination*, 515 (2021), pp. 1-10.
International Search Report & Written Opinion issued in PCT Application No. PCT/IB2022/062168, dated Mar. 2, 2023.
International Search Report & Written Opinion issued in PCT Application No. PCT/IB2022/062404, dated Mar. 3, 2023.
International Search Report & Written Opinion issued in PCT Application No. PCT/US2019/047751, dated Oct. 29, 2019.
Loganathan, P. et al., "Mining valuable minerals from seawater: a critical review", *Environmental Science Water Research & Technology*, 3, pp. 37-53, 2017.

(56) References Cited

OTHER PUBLICATIONS

Meijer et al., "Solubilities And Supersaturations Of Calcium Sulfate And Its Hydrates In Seawater", *Desalination*, vol. 51 (1984), pp. 255-305.
Nativ et al., "DiaNanofiltration-based method for inexpensive and selective separation of Mg2+ and Ca2+ ions from seawater, for improving the quality of soft and desalinated waters", *Separation and Purification Technology*, 166 (2016), pp. 83-91.
Nativ et al., "Desalinated brackish water with improved mineral composition using monovalent-selective nanofiltration followed by reverse osmosis", *Desalination*, 520 (2021), pp. 1-7.
Nativ et al., "Dia-nanofiltration-electrodialysis hybrid process for selective removal of monovalent ions from Mg2+ rich brines", *Desalination*, 481 (2020), pp. 1-12.
Peters, C.D. et al., "Osmotically assisted reverse osmosis (OARO): Five approaches to dewatering saline brines using pressure-driven membrane processes", *Department of Engineering Science, The University of Oxford*, 17 pages, 2018.
Tang et al., "Highly-selective separation of divalent ions from seawater and seawater RO retentate", *Separation and Purification Technology*, 175 (2017), pp. 460-468.
Tang et al., "Selective separation of divalent ions from seawater using an integrated ion-exchange/nanofiltration approach", *Chemical Engineering & Processing: Process Intensification*, 126 (2018), pp. 8-15.
Weingerger, A. et al., "By-products from saline water conversion plants", *American Cyanamid Company*, 110, 74 pages, 1964.

\* cited by examiner

DESALINATION BRINE CONCENTRATION SYSTEM AND METHOD

CROSS REFERENCE TO RELATED APPLICATIONS

This application is a divisional of U.S. application Ser. No. 16/371,816, filed Apr. 1, 2019, the entire disclosures of which are herein expressly incorporated by reference.

The present invention relates to design and operation of desalination facilities, and in particular to a system and method for efficient and economical recovery of minerals and other byproducts from the desalination of saline source water, and for implementing a zero liquid discharge approach to desalination.

BACKGROUND OF THE INVENTION

In the desalination industry, thermal processes have dominated as brine concentrators. Examples of thermal process-based systems include vertical tube evaporators, frequently operated with a mechanical vapor compressor (MVC) or a thermo-vapor compressor (TVC). However, these traditional methods have high-energy consumption. For example, a two-stage MVC brine concentrator may require 24 kiloWatt-hours per cubic meter (kWh/m$^3$) of product water in order to concentrate a feed water having total dissolved solids (TDS) of 70,000 parts per million (ppm) feed to 250,000 ppm. Alternatively, membrane-based concentrators (e.g., reserve osmosis processes) typically require less energy consumption. Accordingly, there is effort to find better membrane-based brine concentration concepts.

For convenience of reference, at most locations herein reference is made to "seawater" as the source water. This reference is not intended to be limiting, as the source water may be any saline water recognized by those of ordinary skill in the art as possible feed water to a desalination facility.

In typical seawater reverse osmosis (SWRO) desalination plants, one of the major concerns is the management of the concentrated brine discharge remaining after separation of potable water (e.g. water with a total dissolved solids (TDS) level of approximately 300 parts per million (ppm) or less). Direct discharge of the brine in its concentrated form may adversely impact the marine environment. Alternative means for disposal of the concentrated brine are costly, due to the relatively large volume of this byproduct and the need to dispose of it in an environmentally responsible manner.

In addition, operation of a desalination facility requires a high monetary cost (facilities, labor, etc.) and high-energy consumption endeavor, with a resulting purified water product having a relatively high specific cost per liter.

Figure 1:
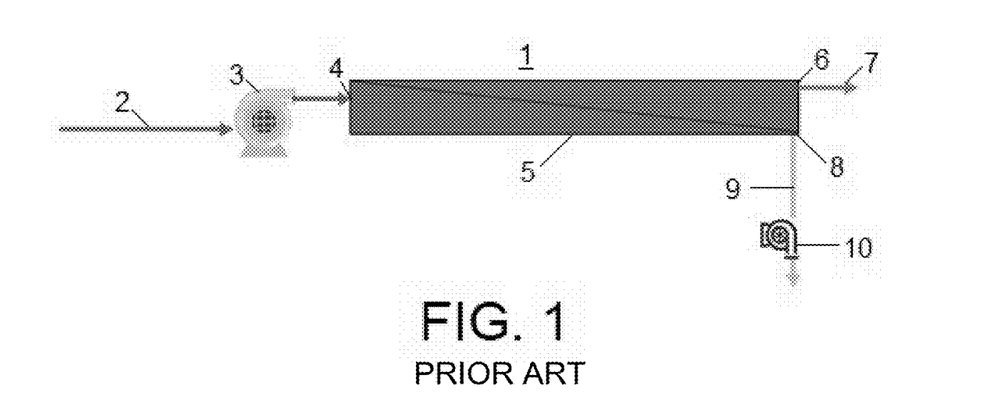
FIG. 1 is a schematic illustration of a typical seawater reverse osmosis system.

FIG. 1 shows a schematic illustration of an example of a typical SWRO system commonly used for high salinity seawaters such as the Arabian Gulf. In this system 1, seawater 2 having a TDS concentration on the order of 42,000 ppm is driven by a pump 3 to a pressure on the order of 69 Bar and introduced into the inlet 4 of a reverse osmosis membrane container 5. A typical reverse osmosis facility membrane system will be capable of only about 50% recovery. Thus, in the FIG. 1 example, at the outlet 6 on the purified water side of the membrane system 5, the product water 7 (i.e., permeate) may have a TDS of less than 300 ppm, while the at the reject brine outlet 8 on the concentration side of the membrane system, the concentrated brine 9 will have a total dissolved solids concentration that is approximately twice that of the inlet seawater, at 84,000 ppm TDS. FIG. 1 also shows a typical feature of seawater desalination plants, in which the high-pressure concentrated brine (here, at approximately 67 Bars) is used to drive an energy recovery device such as a turbine or an isobaric pressure exchanger to recover at least a portion of the energy that had to be put into the inlet seawater to drive the desalination process. The byproduct concentrated brine must then be disposed of (not illustrated in FIG. 1).

Table 1 illustrates why in such a system it is difficult to simply increase recovery beyond 50%. At present most commercially available SWRO membranes are designed to operate with a maximum pressure applied to the membranes of up to 83 Bars (i.e., the typical bursting pressure), while a much higher osmotic pressure difference is expected when the recovery is increased to generate brine TDS concentrations at very high levels. As shown in the Table 1 comparison of the required osmotic pressure ($\pi$) to the specific power consumption (SPC, in kilowatt-hours per cubic meter of product water) required to obtain the purified water, at 60% recovery the osmotic pressure reaches levels undesirably close to membrane bursting levels. Moreover, as the osmotic pressure increases to such high levels, the process becomes less efficient, resulting in higher power consumption (i.e., increasing SPC).

TABLE 1

| Recovery | 35% | 40% | 45% | 50% | 60% | 70% | 80% |
|---|---|---|---|---|---|---|---|
| $\pi$ [bar] | 49.0 | 53.1 | 57.9 | 63.7 | 79.6 | 106.1 | 159.2 |
| SPC [kWh/m3] | 3.01 | 2.90 | 2.82 | 2.78 | 2.77 | 2.86 | 3.07 |

The foregoing example is based on an osmotic pressure calculation assuming a seawater feed TDS concentration of 42,000 ppm at 25° C., a product water TDS concentration of 300 ppm, and use of the Van't Hoff equation with a disassociation constant of 1.8 (assumes the seawater is a sodium chloride solution). The specific power consumption calculation assumes a net driving pressure (NDP) of 22.5 Bar (NDP being approximately equal to the feed pressure minus the logarithmic average of the osmotic pressure difference between the feed (concentrate) and permeate sides of the osmotic membrane), a pump and pump motor efficiency of 85%, and energy recovery device efficiency of 95%, and back pressures for the permeate and brine discharge of 0.8 to 2.0 Bars.

Another problem associated with increasing the recovery is scale deposition on the surface of the membranes, and resultant drastic reduction of membrane ability to permeate low salinity water. Scale deposition typically is not a major issue in conventional seawater desalination systems typically operating at lower recovery levels, e.g., 35 to 45% recovery, because minerals that cause scaling (such as Calcium, Magnesium, Carbonate and Sulfate ions) are at low enough concentrations that they are below the concentrations at which they start precipitating in solid form. In contrast, in SWRO systems operated for recovery higher than 50%, scale deposition on the membranes is very likely to occur.

Figure 2:
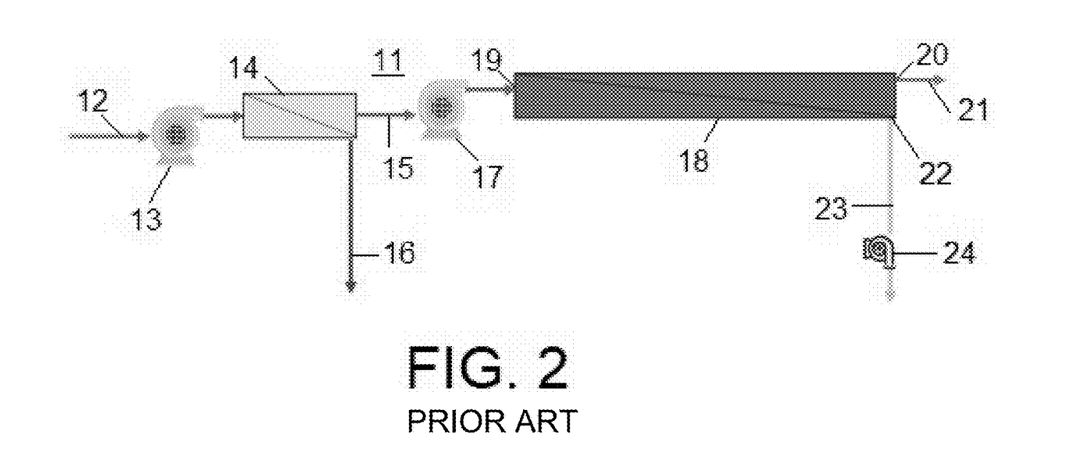
FIG. 2 is a schematic illustration of a typical nano-filtration—seawater reverse osmosis system.

Another known approach to reverse osmosis is a nano-filtration seawater reverse osmosis (NF-SWRO) process, such as that shown in FIG. 2. In this system 11, the seawater 12 at 42,000 ppm TDS is pressurized by pump 13 to approximately 15 Bars before it enters a nano-filtration unit 14. With recovery on the order of 75%, the TDS concentration of the reduced-concentration outlet fluid 15 is only reduced to approximately 34,000 ppm, and the nano-filter byproduct brine 16 has a higher concentration of approximately 67,000 ppm. Due to the relatively low concentration of the brine output, the volume of NF brine is also considerable and must be managed.

After processing through the nano-filtration unit 14, the reduced-concentration outlet fluid 15 is further pressurized by pump 17, in this example to approximately 71 Bars. This high-pressure feed enters a reverse osmosis container 18 via inlet 19. In this example, the recovery is approximately 60%, resulting in discharge at the outlet 20 of product water with a TDS concentration of less than 300 ppm, and concentration side output 22 discharge of brine at 70 Bars with a TDS concentration of 84,000 ppm. As in the first example, an energy recovery device 24 is used to recover a portion of the pressure energy in the brine discharge.

There is a need for an improved system and method for operating a desalination facility that reduces product specific cost, reduces brine volume and disposal costs, improves energy efficiency, and generates concentrated brine products that have commercially-viable applications.

The present invention addresses the foregoing and other problems in the prior art with a dual nano-filtration—reverse osmosis brine concentration system, also referred to as a "DTRI Concentrator."

The invention is a new membrane-based system for concentration of brine, which overcomes the above difficulties and allows concentration of brine to high levels, on the order of 120,000 to 250,000 ppm. These levels are sufficiently high to permit efficient and commercially viable extraction of minerals of commercial value such as calcium sulfate, table salt, magnesium sulfate, lithium, etc. The high salinity levels also allow cost-effective implementation of zero liquid discharge (ZLD).

One unique aspect of the invention is its approach to treatment of two brine output streams from two different concentration processes, one stream being from a nano-filtration process, with rejected brine that is rich in divalent ions, and another other brine stream from a reverse osmosis process having rejected brine that is rich in monovalent ions. The combined processes are arranged in a manner that permits more efficient and less costly transformation of the streams for beneficial use of brine.

Alternatively, the present invention facilitates operation of a zero liquid discharge (ZLD) desalination system, in which the streams are further processed into solid crystal form for beneficial use or for responsible disposal, for example in a properly designed landfill.

In one embodiment of the present invention the saline source water (seawater) is first processed by a nano-filtration membrane system. The permeate from the nano-filtration process, having its TDS concentration reduced (for example, to approximately ¾ of the source seawater), then becomes the inlet source to a reverse osmosis system. The rejected brine stream from the NF system has a TDS level approximately 1.5 times higher than the source seawater, and up to four times higher in divalent ion concentration. A primary purpose of NF system is to remove divalent ions from the seawater, which substantially reduces or even eliminates the build-up of mineral scale deposits on the SWRO membranes.

In order to make the NF reject stream suitable for beneficial use (for example, for extraction of minerals), the NF reject stream is further concentrated using hollow fine fiber (HFF) forward osmosis (FO) membrane system. In one embodiment of this NF reject stream concentration process, the system produces lower-salinity water as a product from the bore-side of HFF FO, which can be blended with the main stream of NF permeate that becomes the inlet source for the SWRO system.

The reject stream from the shell side of the HFF FO process has a very high concentration of divalent minerals, for example, more than 5 times the concentration of calcium and magnesium as in the source seawater. At this high concentration, the divalent minerals can be cost effectively extracted and used in production of various beneficial commercial products such as gypsum or magnesium sulfate, or reused in the production of desalinated water as a source of minerals for post-treatment of the SWRO permeate (i.e., the product water with TDS<300 ppm).

In the HFF-FO process, the bore-side flow rate typically is smaller than the shell-side flow rate. For example, approximately 7% of the processed NF brine reject stream may be initially directed to the bore-side of HFF to optimize the osmotic pressure difference. The amount of NF reject stream introduced to the bore side of the HFF may be varied, for example in the range of 0 to approximately 30%, depending on the TDS concentration of the saline source water, the target product, and reject streams, as well as the membrane bursting pressure.

In general, HFF membranes are known to have less fouling potential due to their low flux operation as compared to spiral wound membranes, and are preferred for this application. Also, HFF FO systems may be operated with either concurrent flow or counter current flow. While the embodiment discussed in the following detailed description is a concurrent flow arrangement, an HFF FO system with countercurrent flow could also be used, for example, when a higher mineral concentration of the HFF FO reject stream is desired.

Alternatively, a hollow fine filter-reverse osmosis (HFF RO) membranes may be used to concentrate the NF reject stream, while also generating desalinated water of TDS concentration suitable for use as drinking water, i.e., water that may be directly added to the desalinated water product produced by the main SWRO desalination system that receives the NF permeate stream. This HFF RO drinkable water stream could similarly be obtained by operating an HFF FO system without diversion of any of the NF reject stream to the bore side to enhance osmotic pressure difference (i.e., where 0% of the NF reject stream is sent to the bore-side).

The NF reject stream processing may be performed using RO, FO or PRO membrane-based systems, depending on the salinity of the raw seawater and the NF reject conditions, with proper chemical treatment when needed.

Returning to the primary treatment path, after NF treatment, the NF permeate, which has a lower TDS concentration than the source seawater, is fed to the SWRO system. Because the NF permeate stream has a significantly lower TDS concentration, the recovery of SWRO system may be increased to 55% or more with single or multiple stages. Further, because there is very limited quantity of divalent ions in both the SWRO source stream and the resulting RO rejected brine stream as a result of the treatment of the source seawater by NF, the only remaining obstacle for further concentration of the brine produced by the SWRO system would be the required feed pressure to the SWRO elements, which may be higher than their bursting pressure. In order to overcome this problem, a counter-current flow HFF FO may be employed.

In one embodiment, the high TDS concentration SWRO reject stream becomes the feed stream to the first stage of another HFF FO membrane concentrator system. In order to overcome the high osmotic pressure difference, part of the SWRO reject stream is directed to the bore-side of the HFF FO membranes, with a slightly reduced pressure to provide a desired net driving pressure (NDP) from the shell side to bore side of the FO membranes. The remaining portion of the SWRO reject stream is directed to the shell-side of the HFF FO membrane system while maintaining its high pressure. Due to the pressure difference, which is higher than the osmotic pressure difference, allowing the desired net-driving pressure (NDP) to facilitate flow through the membrane fibers (i.e., pure water from shell-side permeates to the bore-side), the SWRO reject stream brine on the shell-side becomes more concentrated while the bore-side stream becomes more diluted. In order to maintain the osmotic pressure difference in a reasonable range, the final bore-side TDS concentration may be set to be at or near the concentration of the NF systems permeate output concentration, with this diluted stream from the HFF-FO bore side being directed back to the primary SWRO source feed stream for reprocessing through the SWRO separation process.

The concentrated outgoing stream (shell side) from the HFF-FO process downstream from the primary SWRO has a very high concentration to TDS, and also has a pressure high enough to reprocess this stream in a further HFF-FO process. In this "second stage" of the HFF FO system, the high TDS HFF FO reject stream may be split to the bore side and the shell side of the second stage HFF-FO system as was done in the upstream (i.e., "first stage") HFF-FO system, in order to maintain the osmotic pressure difference and driving force through the hollow fibers within a reasonable range. The diluted bore-side stream from second stage HFF-FO process maybe be returned to corresponding intermediate feed stream between stages of primary SWRO process, for example, added to the SWRO reject brine stream from a 1st SWRO stage that is the source stream of a second SWRO stage.

As with the highly concentrated reject brine stream from the HFF-FO system that receives the NF system reject stream, the highly concentrated shell-side reject stream from the second stage HFF-FO process may be recovered as a useful resource product, in this case having a high content of monovalent ions such as sodium and chloride. This would be a valuable product for the chemical manufacturing industry, which uses such brine for various processes. Alternatively, even if not used for any other purpose, this concentrated brine has over two times smaller volume than the SWRO brine from a typical SWRO process, and can be processed through a crystallizer system to convert the highly concentrated brine into a disposable solid residue, thereby achieving a zero liquid discharge system.

The number of SWRO stages and the number of HFF FO brine concentration stages in the present invention's dual NF and SWRO brine concentration system may be varied depending on the TDS and mineral content of the saline source water and the desired final TDS level of the concentrated brine.

Like the HFF-FO system downstream of the primary NF process, instead of the HFF FO brine concentration system other types of RO, FO or PRO membrane-based systems may be used as a concentrator, depending on the final brine concentration requirement and the allowable membrane bursting pressure. In general, a key requirement for such membranes is to have higher water permeability, lower solute permeability, and higher busting pressure.

Although a membrane bursting pressure characteristic of most commercially available SWRO elements is used in the embodiment in the following detailed description, membrane products of bursting pressure of up to 120 Bars being commercialized by a number of membrane suppliers may be used in the present invention proposed invention. Regardless of what is the actual bursting pressure of commercially available membrane elements, a key feature of the present invention is maintaining the osmotic pressure difference on the two sides of the membrane below the bursting pressure, so that a certain net driving pressure is available to create water transport from the concentrate side to the diluted side of the membrane, in a stage-wise manner, to reach the target final concentrate TDS.

Other objects, advantages and novel features of the present invention will become apparent from the following detailed description of the invention when considered in conjunction with the accompanying drawings.

DETAILED DESCRIPTION

Figure 3:
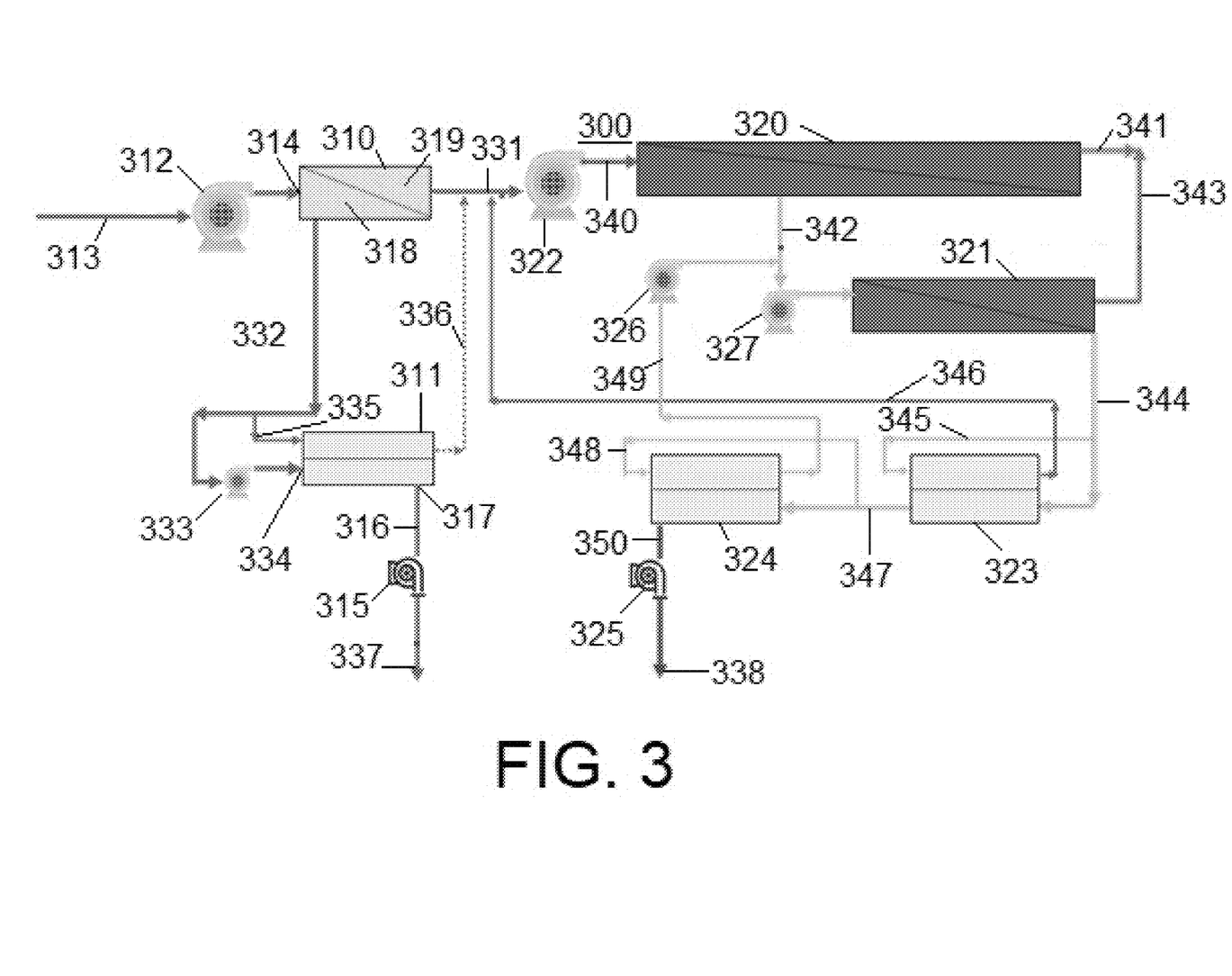
FIG. 3 is a schematic illustration of an embodiment of a dual nano-filtration—reverse osmosis brine concentration system in accordance with the present invention.

FIG. 3 schematically shows the features of an embodiment of a dual nano-filtration—reverse osmosis brine concentration system in accordance with the present invention. The dual NF-SWRO brine concentration system 300 includes a nano-filtration system 310 and a two-stage reverse osmosis system with a first membrane unit 320 and a second membrane unit 321.

In the NF portion in this embodiment of brine concentration system 300, there is further an NF-side hollow fine fiber-forward osmosis unit 311, a NF inlet pump 312 that increases the pressure of the source seawater stream 313 being fed to inlet 314 of the NF system 310, and a NF-side energy recovery device 315 (e.g., a pump) that recovers pressure energy from the concentrated NF brine reject product stream 316 emitted from the HFF unit shell-side outlet 317.

In the SWRO portion of brine concentration system 300, there is an SWRO inlet pump 322, a first stage hollow fine filter-forward osmosis unit 323, a second stage hollow fine filter-forward osmosis unit 324, an SWRO-side energy recovery pump 325, and two intermediate pumps 326, 327.

The following provides a description of the operation of the FIG. 3 embodiment, using approximate numerical values that are provided solely for illustrative purposes, recognizing that the details of a specific installation of a facility incorporating this novel dual nano-filtration—reverse osmosis brine concentration system, as well as the desired qualities of both the product water and the highly concentrated reject brine streams, will drive the actual system operating parameters. Variables that may affect the system operating parameters include the salinity level of the source seawater, the ambient temperature of the source seawater, the temperature of the ambient environment to which process heat is rejected, etc. Note that due to rounding, numbers such as mass flows may not sum to 100% from the beginning to the end of the operations.

The source seawater 313 in this embodiment is assumed to have a TDS concentration of 42,000 ppm and a temperature of 25° C. Pump 312 raises the pressure of the seawater to approximately 15 Bars at a flow rate of approximately 11.5 tons/hour, and passes the pressurized seawater via inlet 314 to NF system 310's brine side 318. The NF system 310 in this example provides approximately 75% recovery, with the lower-concentration stream 331 from the permeate side 319 of the NF system 310 being produced at a rate of approximately 8.6 tons/hour at a TDS concentration of approximately 33,600 ppm, and the divalent-ion-rich rejected brine stream 332 leaving the brine side of the NF system 310 at a rate of approximately 2.9 tons/hour at a TDS concentration of approximately 67,000 ppm.

The majority of the NF reject brine stream 332 has its post-NF system pressure of approximately 13 Bar increased by an intermediate pump 333 to approximately 60 Bar before the stream is feed to the inlet 334 of the shell side of the HFF-FO unit 311. As small portion 335 of the NF reject brine stream 332 (in this example, approximately 7%) is also fed to the bore side of the HFF-FO unit 311, in this example at a rate of approximately 0.2 tons/hour, to limit the differential pressure between the shell and bore sides to minimize the potential for membrane failure.

The output of the NF-side HFF-FO unit 311 includes a lower concentration flow 336 at approximately 19,000 ppm at a rate of approximately 0.7 tons/hour, and the highly concentrated, divalent ion-rich NF-side HFF-FO reject product stream 316 at approximately 83,000 ppm at a rate of approximately 2.2 tons/hour. The lower concentration flow 336 in this embodiment is blended with and further lowers the concentration of the NF system's lower-concentration stream 331 (i.e., 19,000 ppm fluid diluting the 33,600 ppm fluid in stream 331) prior to entry into the SWRO side of the NF-SWRO brine concentration system 300. The NF-side HFF-FO brine reject product stream 316, still having a pressure of approximately 59 Bars, releases a portion of its energy in the NF energy recovery device 315. With an energy recovery efficiency on the order of 80%, the energy recovery device 315 may return several kW for further use. The final product 337 of this portion of the NF-SWRO brine concentration system 300, is released with its pressure lowered to approximately 2 Bars for further processing, such as divalent mineral extraction.

On the SWRO side of the NF-SWRO brine concentration system 300, the SWRO inlet pump 322 receives the diluted stream 331 at a rate of approximately 9.3 tons/hour and at approximately 32,500 ppm, and raised the pressure of the stream to approximately 69 Bars. This SWRO inlet stream 340 then enters the inlet of the brine side of the first stage 320 of the SWRO system. Because the saline water being fed to the SWRO system has a significantly lower TDS, it is possible to increase the recovery of SWRO system to 55% or more.

At a net driving pressure (NDP) of approximately 30 Bars, the SWRO first stage 320 operates at approximately 58% recovery, producing relatively low pressure (approximately 2 Bar) permeate 341 with a TDS concentration of less than 300 ppm at a rate of approximately 5.4 tons/hour, and an SWRO brine reject stream 342 of approximately 78,000 ppm at a rate of approximately 3.9 tons per hour at approximately 68 Bars.

The reject brine stream 342 from the SWRO first stage 320 is then fed to the SWRO second stage unit 321, via an intermediate pump 327 which increases the stream pressure to approximately 80 Bar. The second reverse osmosis stage, operating at 20% recovery, generates permeate water product 343 at the rate of approximately 0.8 tons/hour. With a TDS concentration below 300 ppm, this product water 343 may be combined with the similar-concentration product water 341 from the SWRO first stage 320.

The now monovalent ion-rich SWRO reject brine stream 344 emerges from the SWRO second stage 321 with a TDS concentration of approximately 97,000 ppm at a rate of approximately 3.1 tons/hour at approximately 79 Bars. The majority of the reject brine stream 344 enters the shell side of first stage countercurrent HFF-FO unit 323, while a small portion 345 (approximately 0.2 tons/hour) is injected into the bore side to offset the shell-side pressure to avoid membrane rupture. Operating at approximately 17% recovery, the SWRO first stage HFF-FO unit 323 generates a bore-side stream 346 with a TDS concentration of approximately 32,500 ppm at approximately 0.7 tons/hour. In this example the operating parameters of the SWRO HFF-FO unit 323 (e.g., NDP) have been adjusted so that the concentration of the bore-side stream 346 is approximately the same as the concentration of the stream entering SWRO inlet pump 322.

The HFF-FO first stage unit 323 also generates a higher-concentration brine stream 347 at approximately 117,000 ppm at a rate of 2.4 tons/hour. As with the first stage, the majority of the brine stream 347 is fed into the shell side of the HFF-FO second stage unit 324, with a small portion 348 (approximately 0.7 tons/hour) being fed into the bore side to provide the desired counter-pressure. The second stage 324, operating with approximately 21% recovery, generates a bore-side outlet stream 349 with a TDS concentration of approximately 78,000 ppm at a rate of approximately 1.0 ton/hour. In this embodiment, the HFF-FO second stage bore-side outlet stream 349 is returned via intermediate pump 326 to the brine stream 342 flowing from the SWRO first stage 320 to SWRO second stage 321. As with the HFF-FO first stage 323, the operating parameters of the HFF-FO second stage unit 324 are adjusted such that the concentration of the outlet stream 349 is approximately the same as the brine stream passing between the SWRO stages.

The HFF-FO second stage unit 324 also outputs the highly-concentrated, monovalent ion-rich reject brine stream 350 at approximately 1.3 tons/hour at approximately 147,500 ppm TDS concentration and approximately 78 Bars. The reject brine stream 350 then passes through SWRO energy recovery device 325 to recover approximately 2.8 kW before rejecting the monovalent-rich stream 338 at approximately 2 Bars for further processing, such as monovalent mineral extraction. Moreover, even if not used for any other purpose, the highly concentrated brine has over two times smaller volume than the SWRO brine in a typical conventional SWRO process, such as that in FIG. 1, and this stream may be processed through a crystallizer system to convert the highly concentrated brine into a disposable solid residue, thereby providing a system with zero liquid discharge to the environment.

The number of SWRO stages and the number of HFF FO brine concentration stages may be varied depending on the TDS concentration and mineral content of the saline source water and the desired final TDS level of the concentrated brine. Also, the foregoing numerical examples will vary depending on the actual facility design, and use of features such as recycling flow, which provides steady-state operating numbers that are slightly different than in a first cycle.

Figure 4:
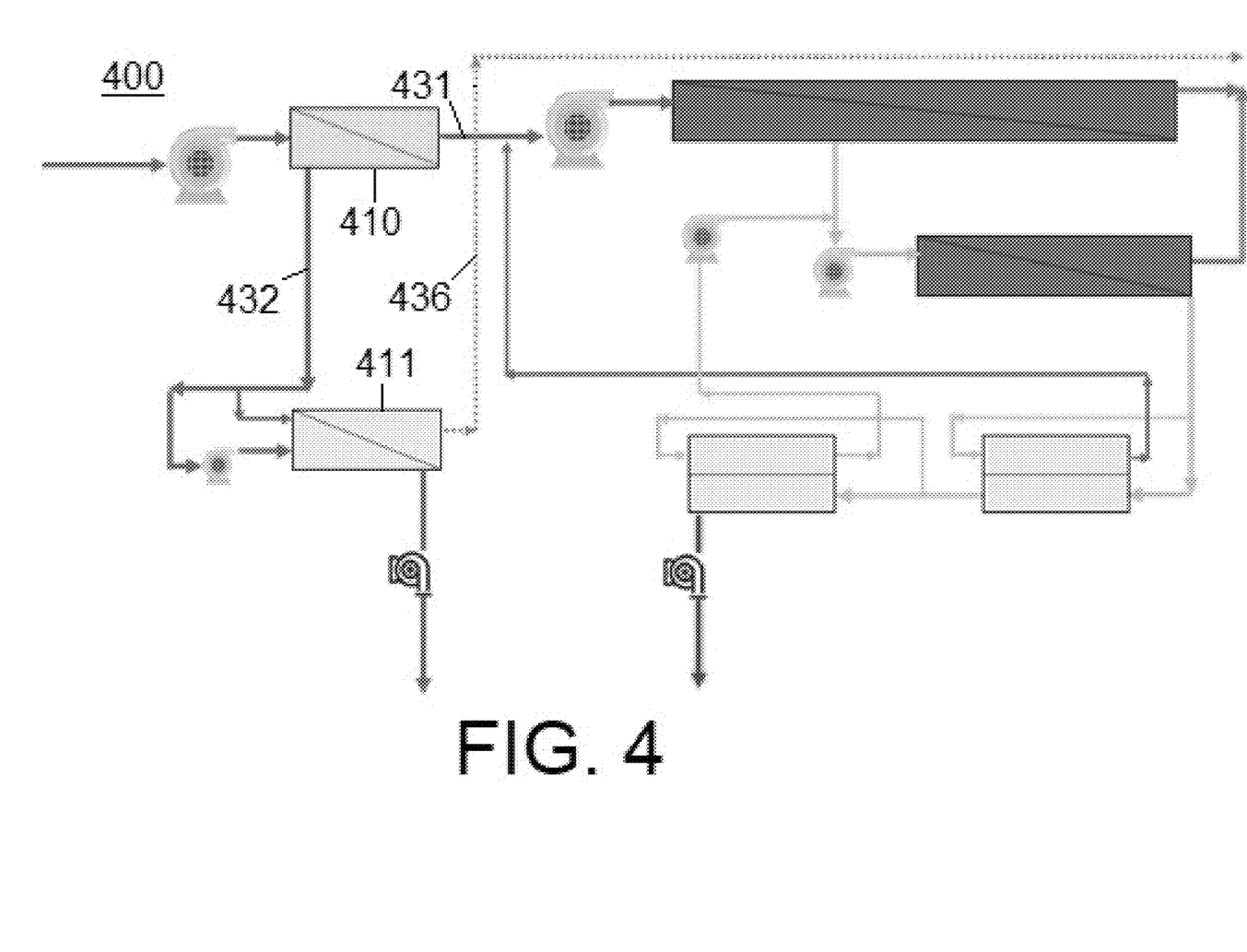
FIG. 4 is a schematic illustration of another embodiment of a dual nano-filtration—reverse osmosis brine concentration system in accordance with the present invention.

Another embodiment of the present invention is illustrated in FIG. 4. In this embodiment, the primary components and flows of the NF-SWRO brine concentration system 400 are generally as in the FIG. 3 embodiment.

However, in FIG. 4 rather than using a NF-side HFF-FO unit 311, a reverse osmosis unit 411 further concentrates the reject brine stream 432 from the NF system 410. Because the resulting permeate stream 436 from the RO unit 411 has a substantially lower TDS concentration (less than 1000 ppm) as compared to the NF-side HFF-FO unit 311's permeate stream 336 (approximately 19,000 ppm), the stream 436 is not combined with the NF system's lower concentration stream 431 as in the FIG. 3 embodiment, but instead is routed outside of the NF-SWRO brine concentration system 400 for use in other applications and/or further processing, for example, to further lower its sub-1000 ppm TDS concentration.

As demonstrated in the foregoing example embodiments, the DTRI concentrator of present invention allows the reverse osmosis system recovery level to be significantly increased, as well as increasing energy savings and at the same time yielding a useful byproduct production, while not exceeding the commercially-available membranes' typical burst pressures. Comparison of examples of SWRO, NR-SWRO and the present invention's system shows improvements in recovery, with an example DTRI Concentrator achieving recovery of 61.5% as compared to 50% for SWRO and 45% for NF-SWRO systems, and specific power consumption of 4.5 kWh/$m^3$ of product water, as compared to conventional brine concentrators which typically use 15-25 kWh/$m^3$.

Although 83 Bars is assumed as a bursting pressure in this example embodiment, membrane products having higher bursting pressure (in some cases, up to 120 Bars) may be used in the present invention, with appropriate adjustment of the system operating parameters, as long as the osmotic pressure difference on the two sides of the membranes is maintained below the bursting pressure.

The present invention is not limited to solely to systems having a nano-filtration unit to receive the saline source water, as long as the alternative to the nano-filtration unit provides for selective removal of at least some of the divalent ions from the source seawater before separation in a SWRO membrane unit. For example, the present invention includes a system that does not have NF membrane treatment of the saline source water, but instead has an HFF FO concentrator, optionally with chemical treatment if needed. Similarly, a brackish water reverse osmosis (BWRO) system may be used instead of a NF unit to provide selective ion removal prior to SWRO processing.

The processing of the nano-filtration retentate discharge may also be provided by alternative concentration processes, such as use of HFF-FO in concurrent and/or counter-current flow patterns, use of HFF-RO units that also generate a low concentration (e.g., less than 1000 ppm) permeate fresh water product, and/or use of other types of membranes to further concentrate the nano-filtration retentate discharge stream.

On the SWRO side of the system, the SWRO retentate concentration portion may include multiple concentration stages (e.g., 1-5 stages of HFF and/or other types of concentrators that are effective at concentrating a monovalent ion discharge stream). depending on, for example, a particular installation's saline source water TDS, the TDS to be fed to the SWRO unit(s), or the target concentrated brine product TDS.

It is also possible to provide alternative routings of permeate from the hollow fine fiber units, with the separation performance of the individual hollow fine fiber units being adjusted as needed to ensure their respective permeate streams have a TDS concentration that is relatively close to that of the feed stream to which they are being routed. For example, in the FIG. 3 embodiment, the first stage HFF-FO unit 323 may be operated so that its permeate has a concentration altered from 32,500 ppm to around 78,000 ppm to make this permeate suitable for feeding to the reverse osmosis second stage membrane unit 321 instead of the reverse osmosis first stage membrane unit 320.

In addition to recovery of minerals and other byproducts from the concentrated products, the products may themselves be further processed for other purposes and/or used subsequently in other processes. For example, the highly concentrated product(s) may be processed through a crystallizer in order to achieve a zero liquid discharge system. Alternatively, the minerals contained in the divalent ion-rich product from the nano-filtration side of the present dual brine concentration system may be used in further post-generation treatment of the desalinated water produced by the present invention.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS

1 SWRO system
2 seawater
3 pump
4 RO inlet
5 RO system
6 RO product outlet
7 product water
8 RO reject brine outlet
9 concentrated brine
10 energy recovery device
11 nano-filtration system
12 seawater
13 pump
14 nano-filtration unit
15 reduced-concentration outlet fluid
16 nano-filter byproduct brine
17 pump
18 container
19 inlet
20 outlet
21 product water
22 concentration side output
23 reject brine stream
24 energy recovery device
300 NF-SWRO brine concentration system
310 nano-filtration system
311 NF-side hollow fine fiber-forward osmosis unit
312 NF inlet pump 312
313 seawater stream
314 NF inlet
315 NF-side energy recovery device
316 NF-side HFF-FO brine reject product stream
317 HFF unit shell-side outlet
318 NF system brine side
319 NF system permeate side
320 reverse osmosis first stage membrane unit
321 reverse osmosis second stage membrane unit
322 SWRO inlet pump
323 first stage hollow fine filter-forward osmosis unit 324 second stage hollow fine filter-forward osmosis unit
325 SWRO-side energy recovery pump 325
326 intermediate pump
327 intermediate pump
331 lower-concentration stream
332 reject brine stream
333 intermediate pump
334 HFF-FO unit shell side inlet
335 portion of reject brine stream
336 NF-side HFF-FO unit lower concentration flow
337 NF-side brine concentration system product
338 SWRO-side brine concentration system product
340 SWRO inlet stream
341 permeate product water
342 SWRO brine reject stream
343 permeate water product
344 SWRO reject brine stream
345 portion of reject brine stream
346 bore-side stream
347 higher-concentration brine stream
348 portion of higher-concentration brine stream
349 HFF-FO second stage bore-side outlet stream
350 monovalent ion-rich reject brine stream
400 NF-SWRO brine concentration system 400
411 reverse osmosis unit
431 NF system lower concentration stream
432 reject brine stream
436 permeate stream

What is claimed is:

1. A brine concentration system, comprising:
a divalent ion concentration unit;
a first reverse osmosis membrane unit;
a second reverse osmosis membrane unit;
a first brine concentrator; and
a second brine concentrator,
wherein, the divalent ion concentration unit is configured to receive a saline source stream at a retentate side of the divalent ion concentration unit, and output a retentate side stream and a permeate side stream,
the first reverse osmosis membrane unit is configured to receive at least a portion of the divalent ion concentration unit permeate side stream at a retentate side, and output a retentate side stream and a permeate side stream,
the second reverse osmosis membrane unit is configured to receive at least a portion of the first reverse osmosis unit retentate side stream at a retentate side, and output a retentate side stream and a permeate side stream,
the first brine concentrator is configured to receive at least a portion of the second reverse osmosis membrane unit retentate side stream at a retentate side, and output a retentate side stream and a permeate side stream,
the second brine concentrator is configured to receive the at least a portion of first brine concentrator retentate side stream at a retentate side, and output a retentate side stream and a permeate side stream, and
the first reverse osmosis membrane unit is configured to receive, at a retentate side only, at least a portion of the permeate side stream from the first brine concentrator and/or at least a portion of the permeate from the second brine concentrator, and the second reverse osmosis membrane unit is configured to receive, at a retentate side only, at least a portion of the permeate side stream from the first brine concentrator and/or at least a portion of the permeate from the second brine concentrator.

2. The brine concentration system of claim 1, wherein the divalent ion concentration unit is a nanofiltration unit, a hollow-fine fiber forward osmosis (HFF-FO) unit, or a brackish water reverse osmosis (BWRO) unit.

3. The brine concentration system of claim 1, further comprising a third brine concentrator system operably linked to the divalent ion concentration unit retentate side stream.

4. The brine concentration system of claim 3, wherein the third brine concentrator system comprises at least one nano-filtration unit, a first nano-filtration unit, wherein the first nano-filtration unit is configured to receive at least a portion of the retentate side stream of the divalent ion concentration unit, and configured to deliver at least a portion of a permeate to the first reverse osmosis membrane unit.

5. The brine concentration system of claim 4, further comprising at least a second nano-filtration unit configured to receive at least a portion of a retentate of the first nano-filtration unit, and configured to deliver at least a portion of a permeate to the first reverse osmosis membrane unit.

6. The brine concentration system of claim 1, wherein the second reverse osmosis membrane unit has a bursting pressure of up to 120 Bars.

7. The brine concentration system of claim 1, wherein the first brine concentrator comprises a reverse osmosis membrane.

8. The brine concentration system of claim 1, wherein the second brine concentrator comprises a reverse osmosis membrane.

9. The brine concentration system of claim 1, wherein the first reverse osmosis membrane unit is configured to receive, at a retentate side only, at least a portion of the permeate side stream from the first brine concentrator without the portion of the permeate side stream from the first brine concentrator contacting another reverse osmosis membrane and/or brine concentrator membrane between the first reverse osmosis membrane and the first brine concentrator.

10. The brine concentration system of claim 1, wherein the second reverse osmosis membrane unit is configured to receive, at a retentate side only, at least a portion of the permeate side stream from the second brine concentrator without the portion of the permeate side stream from the second brine concentrator contacting another reverse osmosis membrane and/or brine concentrator membrane between the second reverse osmosis membrane and the second brine concentrator.

11. The brine concentration system of claim 1, wherein the system is configured to produce the retentate from the second brine concentrator comprising a mineral concentration of 120,000 to 250,000 parts per million (ppm).

12. The brine concentration system of claim 1, further comprising a crystallizer configured to receive at least a portion of a retentate stream from the second brine concentrator.

13. The brine concentration system of claim 12, wherein the crystallizer is configured to crystalize sodium chloride.

14. The brine concentration system of claim 1, further comprising one or more energy recovery devices operably connected to the divalent ion concentration unit retentate stream, first brine concentrator retentate stream, and/or second brine concentrator retentate stream.

15. The brine concentration system of claim 1, wherein a recovery of the brine concentration system is at least 60%.

16. A brine concentration system, comprising:
a divalent ion concentration unit;
a first reverse osmosis membrane unit;

a second reverse osmosis membrane unit;
a first brine concentrator; and
a second brine concentrator, wherein, the divalent ion concentration unit is configured to receive a saline source stream at a retentate side of the divalent ion concentration unit, and output a retentate side stream and a permeate side stream, the first reverse osmosis membrane unit is configured to receive at least a portion of the divalent ion concentration unit permeate side stream at a retentate side, and output a retentate side stream and a permeate side stream, the second reverse osmosis membrane unit is configured to receive at least a portion of the first reverse osmosis unit retentate side stream at a retentate side, and output a retentate side stream and a permeate side stream, the first brine concentrator is configured to receive a first portion of the second reverse osmosis membrane unit retentate side stream at a retentate side, and a second portion of the second reverse osmosis membrane unit retentate side stream at a permeate side, and output a retentate side stream and a permeate side stream, the second brine concentrator is configured to receive a first portion of the first brine concentrator retentate side stream at a retentate side, and a second portion of the first brine concentrator retentate side stream at a permeate side, and output a retentate side stream and a permeate side stream, and the first reverse osmosis membrane unit is configured to receive, at a retentate side only, at least a portion of the permeate side stream from the first brine concentrator and/or at least a portion of the permeate from the second brine concentrator, and the second reverse osmosis membrane unit is configured to receive, at a retentate side only, at least a portion of the permeate side stream from the first brine concentrator and/or at least a portion of the permeate from the second brine concentrator.

* * * * *